Sept. 22, 1970 W. ULLMANN ET AL 3,530,271
ELECTRO-EROSIVE WORKING ELECTRODE HAVING MULTIPLE
INDIVIDUALLY INSULATED ELEMENTS
Filed July 24, 1967 3 Sheets-Sheet 1

INVENTORS
WERNER ULLMANN
ROBERT FARINELLI

BY Jacobi & Davidson

ATTORNEYS

INVENTORS
WERNER ULLMANN
ROBERT FARINELLI

United States Patent Office 3,530,271
Patented Sept. 22, 1970

3,530,271
ELECTRO-EROSIVE WORKING ELECTRODE HAVING MULTIPLE INDIVIDUALLY INSULATED ELEMENTS
Werner Ullmann, Locarno, and Robert Farinelli, Losone, Switzerland, assignors to AG. fur Industrielle Elektronik Agie Losone B. Locarno, Losone-Locarno, Switzerland
Filed July 24, 1967, Ser. No. 655,630
Claims priority, application Switzerland, July 29, 1966, 11,019/66
Int. Cl. B23p 1/04, 1/08
U.S. Cl. 219—69          13 Claims

ABSTRACT OF THE DISCLOSURE

An electrode for the electro-erosive machining of an oppositely situated workpiece which defines therewith an erosion gap filled with a dielectric liquid. The inventive electrode comprises a plurality of neighboring individual electrically conducting elements, and means for insulating the aforesaid plurality of individual elements from one another. Such insulating means comprises a respective insulating layer disposed between said neighboring individual elements, and each insulating layer possesses a thickness in the order of magnitude of the width of the erosion gap.

BACKGROUND OF THE INVENTION

The present invention relates to an improved electro-erosive working electrode which is disposed opposite a workpiece and defines therewith an erosion or work gap filled with a dielectric liquid, an electro-erosion pulse generator for supplying the working pulses at relatively high repetition frequency being connected to the working electrode at one pole and to the workpiece at its other pole.

A known prior art working electrode consists of a number of individual electrodes. These individual electrodes are employed to produce as many holes in the workpiece in one operation as there are individual electrodes. The individual electrodes are thus very widely spaced apart. No insulating layer is present between these individual electrodes.

Another known working electrode consists of a number of tubular individual electrodes between which there is provided an insulating layer. However, this insulating layer is of such thickness that the pattern of such layer is reproduced in the workpiece during electro-erosive machining or working. Further, such insulating layer is only intended to maintain the width of the erosion gap. The tubes serve to conduct the electrolytic liquid to the workpiece. This known working electrode is only suitable for electrochemical metal working during which direct current flows through the electrode, and electrolytic liquid flows to the workpiece.

SUMMARY OF THE INVENTION

In contradistinction thereto, the invention has for one of its primary objects to provide an improved working electrode for electro-erosive metal working by means of working pulses of very high repetition frequency.

Another equally significant object of the present invention relates to the provision of an improved electrode having increased current carrying capability.

Still a further significant object of the present invention relates to the provision of an improved electrode capable of transferring a large amount of energy to the workpiece with each working pulse.

A further important object of the present invention relates to an improved electrode which is relatively simple and inexpensive to manufacture, extremely reliable and efficient in operation, and capable of reproducing complex configurations in workpieces in a most accurate fashion.

Generally speaking, in order to achieve these and still further objects of the invention which will become more readily apparent as the description proceeds, the inventive electrode is composed of a plurality of individual electrically conducting elements, formed of metal for instance. In order to reduce the electrical resistance of the electrode the surface of its periphery is subdivided into a multiplicity of areas, and at least three of these areas are associated with one such element. Additionally, the areas or surfaces of each individual element are insulated with a layer whose thickness is in the order of magnitude of the width of the erosion gap.

BRIEF DESCRIPTION OF THE DRAWINGS

The invention will be better understood, and objects other than those set forth above, will become apparent, when consideration is given to the following detailed description thereof. Such description makes reference to the annexed drawings wherein like reference numerals have generally been employed throughout for the same or analogous elements, and wherein.

DESCRIPTION OF THE PREFERRED EMBODIMENTS

Figure 1:
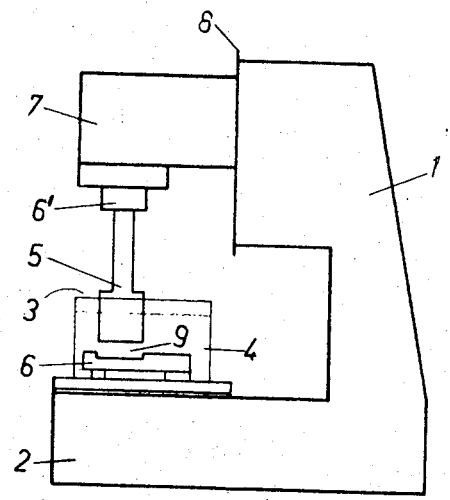
FIG. 1 schematically illustrates an embodiment of electro-erosive working machine.

Describing now the drawings, the electro-erosive working machine of FIG. 1 consists of an upright or pillar 1 mounted on a table 2. Disposed on the table 2 is the container or vessel 3 containing the dielectric liquid 4. This dielectric liquid 4 is maintained in continuous movement by means of a conventional pump unit provided in the machine. The dielectric liquid 4 is pumped either through suitable channels in the electrode 5 to the workpiece 6 or directly into the vessel or container 3. Such pump unit sucks the liquid out of the container 3 through an appropriate outlet (not shown). The electrode 5 is connected to a standard electrode feed device 7 through the agency of a holder device 6'. Provided in the feed device 7 are the usual means for moving the electrode 5 towards or away from the workpiece 6. The feed device 7 slides on the schematically depicted rail means 8 in either one direction or the other.

In addition, connecting cables 120, 121 and so forth are provided for the electrical connection of each individual element 100 to 117 of the electrode 5 to one pole of the pulse generator arranged in the working machine. These cables 120, 121, etc. may be connected either to the negative output of the electro-erosive pulse generator or to the negative outputs of a number of pulse generators. This depends upon whether the current strength necessary for the required working operation may be supplied by one pulse generator or by a number of pulse generators. The workpiece 6 is connected to the positive output of the pulse generator or generators. Of course, the workpiece 6 may be also connected to the negative output of the pulse generator or generators and the electrode 5 to the positive output thereof.

The electrode 5 defines with the workpiece 6 an erosion gap 9. This erosion gap, the width of which has been exaggerated in the drawing, is $10^{-1}$ to $10^{-3}$ millimeters wide during the working or machining operation. The pulse generator supplies working pulses at a repetition frequency of 100 kc./s. to 2 mc./s. In order to obtain a very high speed of the erosion of the material from the workpiece 6, the repetition frequencies must be very high and at the same time each working pulse must possess high energy. At these high repetition frequencies, a voltage of about 40 to 60 volts is present between the electrode 5 and the workpiece 6. Current densities of 1 to 150 amperes/cm.$^2$ are employed. If the electrodes have very large solid dimensions, for example for the production of drop forge dies, large currents flow through the erosion or work gap 9.

Figure 2:
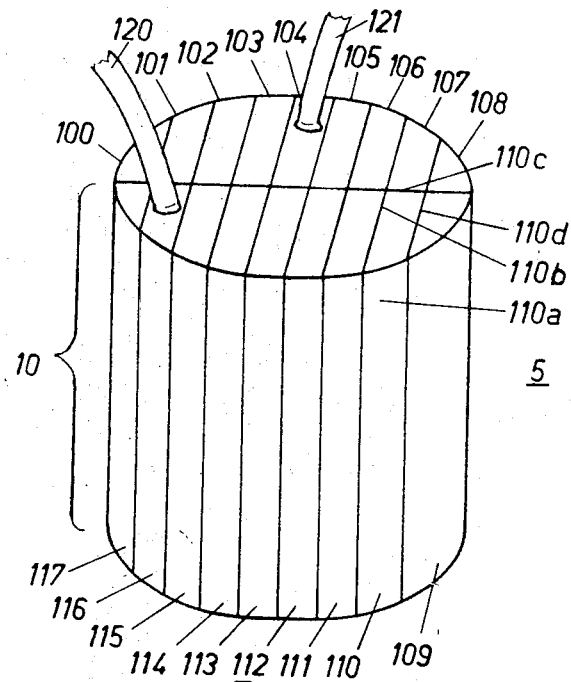
FIG. 2 is a perspective view of a cylindrical electrode composed of a number of individual elements.

FIG. 2 illustrates details of a cylindrical electrode 5 composed of a multiplicity of individual electrode elements 100 to 117. These elements 100 to 117 are separated by an insulating layer. For the sake of clarity, this insulating layer has not been particularly shown in this figure, but will be shown and considered in greater detail hereinafter. The thickness of the insulating layer is approximately equal to the width of the erosion gap 9. The lower end of the electrode 5 is situated opposite to the workpiece 6 (FIG. 1). Connected to the upper end of the electrode 5 are the cables leading from each element 100 to 117 to the electro-erosion pulse generator. For convenience in illustration, only two lead cables 120, 121 are shown. These are connected as by being soldered or welded, for instance, to the elements 104, 116. All the elements 100 to 117 have the same polarity since all the cables 120, 121, etc. are connected in parallel to one output of one or more pulse generators, as already stated. The surface 10 of the periphery of the cylindrical electrode 5 is thus subdivided into a large number of smaller areas formed by the elements 100 to 117. Also for the sake of clarity in illustration, only the boundary faces 110a, 110b, 110c, 110d of the element 110 have been designated. Each element 100 to 117 has either three or four such boundary faces, all of which lie parallel to the longitudinal axis of the electrode 5. Owing to the subdivision of the whole peripheral surface of the electrode 5, the electrical resistance of such electrode is very greatly reduced, especially at very high repetition frequencies of the, for example, square-wave working pulses. Owing to this considerable reduction of resistance at high repetition frequencies, a greater amount of energy per working pulse may be chosen. Consequently, the erosive performance of the electro-erosive working operation is greatly increased, because it is proportional to the repetition frequencies and the energy of the working pulses.

A further advantage resides in that the electrode may be composed of a number of elements in accordance with the unit assembly principle. In this way, elements of simple, rectangular or circular or elliptical cross-section may be assembled to form an electrode of any desired shape. This is very advantageous especially in the formation of complex recesses in a workpiece. This is illustrated and explained in greater detail with regard to FIG. 6. FIG. 2 merely shows how the elements 100 to 117 of substantially rectangular cross-section are assembled to form a cylindrical electrode 5. The surface of the electrode 5 may be subsequently worked in any way, so that it acquires the desired shape or form. The layer of insulation, such as represented by reference numeral 11 in FIG. 3 between the individual elements 100 to 117 is either a suitable plastic or an oxide. The elements 100 to 117 may be optionally adhesively bonded together. In the case of unbonded elements, there is no danger of the individual elements 100 to 117 slipping, because the whole electrode 5 is not subject to mechanical load during the electro-erosive working operation. A layer of insulation may be also applied to the surface 10 of the whole electrode 5. This is useful especially when deep holes are to be formed in the workpiece 6. In this case, only the lower cross-sectional area of the electrode 5 participates in the electro-erosive operation.

Figure 3:
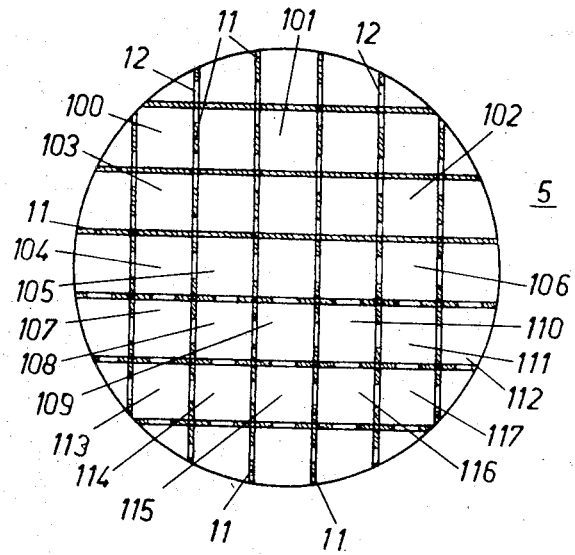
FIG. 3 is a plan view of an electrode.

FIG. 3 illustrates a cylindrical electrode 5 as seen from above. The connecting cables between the elements and the pulse generator are not shown. For the sake of greater clarity, only some of the individual electrode elements are denoted by reference numerals 100 to 117. These elements of substantially square cross-sectional shape have a respective insulating layer 11 on their neighboring boundary faces and are joined together to form a circular electrode 5. Each such insulating layer 11 may be an adhesive from the group of synthetic resins or an adhesive tape. The tape is adhesively secured to the boundary faces of the elements. The layer 11 may also be an oxide layer, for example consisting of cuprous oxide in the case of copper elements. Insulating layer 11 has a thickness of the order of magnitude of the width of the erosion gap 9. If the layer were of greater thickness, the chequered pattern of the layers 11 would be reproduced in the workpiece 6 because, as is known, the electrically non-conductive layers 11 constitute "dead material" for the working pulses. Moreover, a greater layer thickness is also unnecessary because the elements 100 to 117 have the same polarity. During the electro-erosive operation, material is eroded from the workpiece 6, so that the form of the electrode 5 is reproduced in such workpiece. The parts of the electrode 5 at which the working pulses reach the workpiece 6 through the erosion gap 9 are subjected to a low amount of wear in the course of the electro-erosive operation. The insulating layer arrangement 11 is not subjected to any wear. In the course of the electro-erosive operation, the insulating layers 11 extend past those faces of the elements which are subjected to wear and abut the workpiece 6. The electro-erosive operation may thus be interrupted. This is prevented by virtue of the fact that the projecting layers 11 in the erosion gap 9 are advantageously flushed away by the dielectric liquid 4.

FIG. 3 further illustrates channels 12 provided in the insulating layers 11. These channels 12 are so-called capillaries owing to the small thickness of the layers 11. Further, channels 12 are arranged over the entire cross-section of the electrode 5. They are disposed substantially parallel to the axis of the whole electrode 5 and are open at the upper end of the electrode 5 (FIG. 3) and at its lower end. The dielectric liquid 4 is passed out of the feed device 7 through these channels 12 into the erosion gap 9. This dielectric liquid 4 also may be sucked out of the erosion gap 9 through the channels 12. The latter is advantageous because only small parts of the dielectric liquid 4 evaporate during the electro-erosive operation and these vapor bubbles adhere to the lower face of the electrode 5 which is situated in the erosion gap 9 and form an obstacle thereon. By the withdrawal of the dielectric liquid 4 from the erosion gap 9 through the channels 12, these vapor bubbles are removed. These channels 12 are therefore very advantageous for maintaining the optimum flushing conditions in the erosion gap 9.

Figure 4:
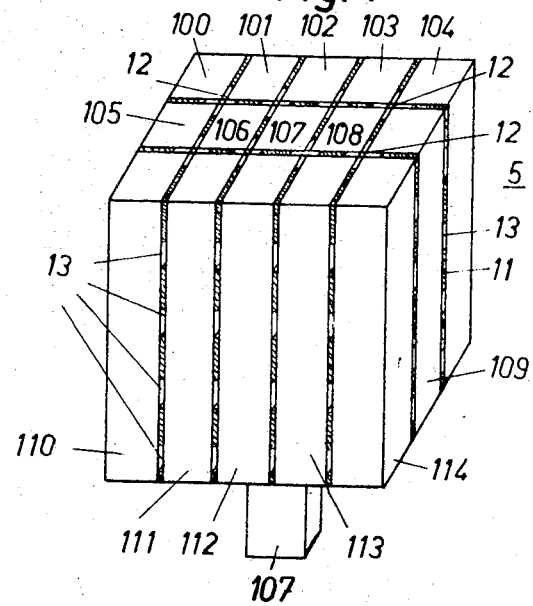
FIG. 4 is a perspective view of a rectangular electrode composed of a number of individual elements.

FIG. 4 illustrates a substantially rectangular electrode 5 consisting of the individual rectangular electrode elements 100 to 114. The previously considered supply cables are secured to these elements 100 to 114 in the same way as already described and, therefore, they have not been further shown in this figure. The layers 11 are not only advantageously formed with channels 12 extending parallel to the longitudinal direction of the electrode 5, but also with channels 13 extending transversely to the longitudinal direction of the electrode 5. The channels 12 have already been discussed with reference to FIG. 3. The channels 13 serve to bring the dielectric liquid 4 into the erosion gap 9 when a deep hole is to be made in the workpiece 6 and the electrode 5 has already penetrated a few centimeters into the workpiece 6. If the channels 13 were not present, no proper flushing conditions would be maintained by the dielectric liquid 4 in the very narrow erosion gap 9 in the case of deep holes. FIG. 4 further shows that the elements 100 to 114 may have different lengths. For example, the element 107 is longer than the other elements. By means of this element 107, a smaller hole may be eroded in the workpiece 6 before the larger hole.

Figure 5:
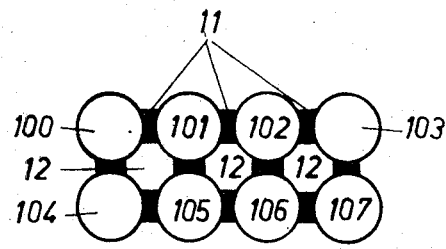
FIG. 5 is a plan view of a modified form of electrode composed of elements of substantially circular cross-section.

FIG. 5 illustrates a number of elements 100 to 107 of circular cross-section, and between such neighboring elements there is provided a respective insulating layer 11. The channels 12 in this example are considerably larger. The circular elements 100 to 107 may thus be assembled to form a rectangular electrode. The outside faces of the electrode may be smoothed with a material so that a rectangular electrode which is smooth in every respect in obtained. The supply cables are also connected to each element, as already explained. FIG. 5 shows only a part of a whole electrode.

Figure 6:
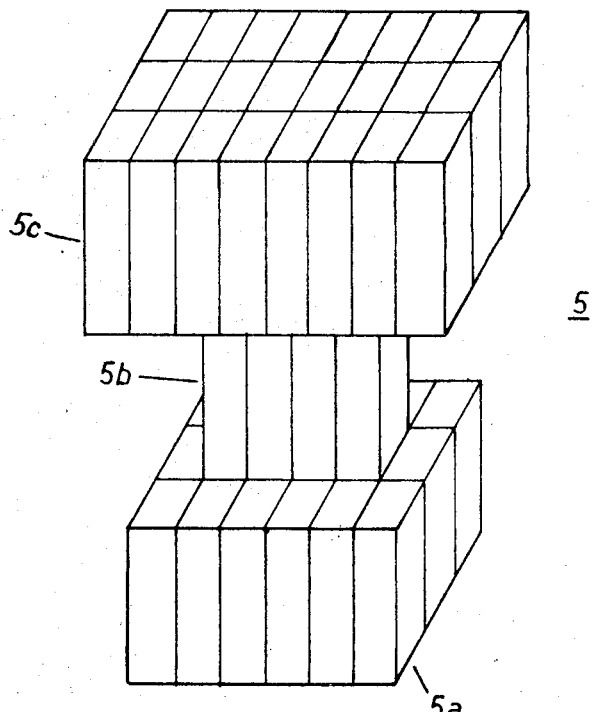
FIG. 6 is a perspective view of an electrode whose elements have different lengths.

FIG. 6 illustrates an electrode 5 composed of a multiplicity of elements. These elements of rectangular cross-section have not been provided with reference numerals, because they have already been adequately described with reference to the earlier embodiments. The elements provided at the lower end of the electrode 5 are intended to form an electrode portion 5a for the production of a particular hole in the workpiece 6. The intermediate electrode portion 5b has smaller solid dimensions than the electrode 5a. The remaining electrode portion 5c has larger solid dimensions than portions 5a and 5b. Such an electrode 5 consisting of the portions 5a, 5b, 5c is employed, for example, for the fully automatic production of complex die forms. But FIG. 6 is only intended to show how multifarious the unit assembly principle is, namely the assembly of an electrode from a number of elements. The elements may have different lengths from one another and even different cross-sections.

In the case of the embodiments heretofore discussed, only particular electrode shapes have been described, but within the scope of the invention electrode forms of any desired cross-section may be assembled from the individual elements, which, in turn, may also have any desired cross-sections.

While there is shown and described present preferred embodiments of the invention, it is to be distinctly understood that the invention is not limited thereto but may be otherwise variously embodied and practiced within the scope of the following claims.

What is claimed is:

1. In an electro-erosion apparatus having an electrode for the high frequency electro-erosive machining of an oppositely situated workpiece which defines therewith an erosion gap which is filled with a dielectric liquid, an improved electrode comprising:
   (a) a plurality of neighboring individual electrically conducting elements, each of said elements being adapted to be maintained at substantially the same electrical potential with respect to one another, and
   (b) means for insulating said plurality of individual electrically conducting elements from one another, said insulating means comprising a respective insulating layer between said neighboring individual elements, each insulating layer possessing a thickness of an order of magnitude substantially equal to the width of the erosion gap, whereby the resistance of said electrode is reduced, reproduction of the pattern of said insulating layers on said workpiece is minimized and flushing away of the insulating layers is facilitated.

2. An electrode as defined in claim 1, wherein confronting surfaces of said neighboring elements are at least partially covered with the respective insulating layer located therebetween.

3. An electrode as defined in claim 2, wherein said individual elements possess a particular and uniform cross-sectional shape and are joined together to form an electrode possessing a cross-sectional shape which differs from that of said individual elements.

4. An electrode as defined in claim 2, wherein said individual elements possess a particular and uniform cross-sectional shape and are joined together to form an electrode possessing the same cross-sectional shape as the individual elements.

5. An electrode as defined in claim 1, wherein said individual elements possess a different length from one another.

6. An electrode as defined in claim 1, wherein at least some of said individual elements possess a different length from one another.

7. An electrode as defined in claim 1, wherein said insulating layer disposed between each neighboring individual elements comprises an electrically non-conductive oxide layer.

8. An electrode as defined in claim 1, wherein said insulating layer between each neighboring individual elements comprises an electrically non-conductive plastic.

9. An electrode as defined in claim 1, wherein each insulating layer consists of a material which can be removed by the pressure of the dielectric liquid in the erosion gap as soon as such insulating layer projects beyond the surface of the associated individual elements participating in the electro-erosive operation as a result of the wear of the metal of any such associated individual elements.

10. An electrode as defined in claim 1, wherein said insulating means between said plurality of individual elements is provided with at least one channel for receiving the dielectric liquid.

11. An electrode as defined in claim 10, wherein said channel is arranged substantially parallel to the longitudinal direction of said individual elements.

12. An electrode as defined in claim 10, wherein said channel is disposed approximately transverse to the longitudinal direction of said individual elements.

13. An electrode as defined in claim 1, wherein each insulating layer has a thickness which is in the range of from $10^{-1}$ to $10^{-3}$ mm.

References Cited

UNITED STATES PATENTS

| 1,788,310 | 1/1931 | Lebrun et al. | 219—146 |
| 2,909,641 | 10/1959 | Kucyn. | |
| 3,271,281 | 9/1966 | Brown et al. | |
| 3,427,423 | 2/1969 | O'Connor. | |

FOREIGN PATENTS

| 856,340 | 12/1960 | Great Britain. |
| 41/3,727 | 3/1966 | Japan. |

R. F. STAUBLY, Primary Examiner

U.S. Cl. X.R.
204—143; 219—146